(12) United States Patent
Andersen et al.

(10) Patent No.: US 10,697,424 B2
(45) Date of Patent: Jun. 30, 2020

(54) MULTIROTOR WIND TURBINE

(71) Applicant: Vestas Wind Systems A/S, Aarhus N. (DK)

(72) Inventors: Peter Bjørn Andersen, Skanderborg (DK); Jonas Lerche Schomacker, Århus V (DK); Anurag Gupta, Manvel, TX (US); Henrik Kudsk, Harlev J (DK)

(73) Assignee: Vestas Wind Systems A/S, Aarhus N. (DK)

( * ) Notice: Subject to any disclaimer, the term of this patent is extended or adjusted under 35 U.S.C. 154(b) by 45 days.

(21) Appl. No.: 16/085,760

(22) PCT Filed: Apr. 4, 2017

(86) PCT No.: PCT/DK2017/050104
§ 371 (c)(1),
(2) Date: Sep. 17, 2018

(87) PCT Pub. No.: WO2017/178025
PCT Pub. Date: Oct. 19, 2017

(65) Prior Publication Data
US 2019/0048847 A1    Feb. 14, 2019

Related U.S. Application Data

(60) Provisional application No. 62/322,353, filed on Apr. 14, 2016.

(30) Foreign Application Priority Data

May 10, 2016    (DK) ................................. 2016 70311

(51) Int. Cl.
*F03D 1/02*     (2006.01)
*F03D 13/20*    (2016.01)
*F03D 7/02*     (2006.01)

(52) U.S. Cl.
CPC ............. *F03D 1/02* (2013.01); *F03D 7/0204* (2013.01); *F03D 13/20* (2016.05);
(Continued)

(58) Field of Classification Search
CPC .......... F03D 1/02; F03D 7/0204; F03D 13/20; F05B 2240/2211; F05B 2240/2213; F05B 2270/402; Y02E 10/723
See application file for complete search history.

(56) References Cited

U.S. PATENT DOCUMENTS 4,110,631 A * 8/1978 Salter ........................ F03D 1/02
                                                                      290/55
4,710,100 A * 12/1987 Laing ........................ F03D 9/28
                                                                      416/11

(Continued)

FOREIGN PATENT DOCUMENTS

CN       102162429 A     8/2011
EP        2463513 A1     6/2012

(Continued)

OTHER PUBLICATIONS

Danish Patent and Trademark Office, Search and Examination Report in PA201670311, dated Nov. 28, 2016.

(Continued)

*Primary Examiner* — Igor Kershteyn
(74) *Attorney, Agent, or Firm* — Wood Herron & Evans LLP

(57) ABSTRACT

A multirotor wind turbine (1) comprising a tower structure (2) and at least one load carrying structure (3, 4), each load carrying structure (3, 4) being arranged for carrying two or more energy generating units (5, 7) comprising a rotor (6, 8). At least two of the rotors are upwind or downwind rotors (6), the energy generating units (5) comprising upwind or downwind rotors (6) being arranged with their centres of gravity (Continued)

at a first distance behind the tower structure (2) along a direction of the incoming wind, substantially at the same vertical level, and at opposite sides of the tower structure (2) at substantially the same second distance to the tower structure (2) along a direction substantially perpendicular to the direction of the incoming wind. The multirotor wind turbine (1) is self-yawing, even under turbulent wind conditions.

12 Claims, 12 Drawing Sheets

(52) U.S. Cl.
CPC .................. *F05B 2240/2211* (2013.01); *F05B 2240/2213* (2013.01); *F05B 2270/402* (2013.01); *Y02E 10/723* (2013.01)

(56) References Cited

U.S. PATENT DOCUMENTS

| | | | | |
|---|---|---|---|---|
| 5,876,181 | A * | 3/1999 | Shin | F03D 1/06 415/2.1 |
| 6,294,844 | B1 * | 9/2001 | Lagerwey | F03D 13/25 290/44 |
| 7,296,974 | B2 * | 11/2007 | Wobben | F03D 1/02 416/132 B |
| 2003/0168864 | A1 | 9/2003 | Heronemus et al. | |
| 2003/0170123 | A1 * | 9/2003 | Heronemus | F03D 1/02 416/41 |
| 2009/0196748 | A1 | 8/2009 | Salter | |
| 2013/0127173 | A1 | 5/2013 | Lee et al. | |
| 2014/0077505 | A1 | 3/2014 | Ishimine | |
| 2017/0335821 | A1 * | 11/2017 | Ohya | F03B 13/26 |
| 2018/0180022 | A1 * | 6/2018 | Baun | F03D 7/0264 |

FOREIGN PATENT DOCUMENTS

| | | |
|---|---|---|
| FR | 2868483 A1 | 10/2005 |
| GB | 2443886 A | 5/2008 |
| JP | 2006322383 A | 11/2006 |
| WO | 9832968 A1 | 7/1998 |
| WO | 0036299 A1 | 6/2000 |
| WO | 2010098813 A1 | 9/2010 |

OTHER PUBLICATIONS

European Patent Office, International Seach Report and Written Opinion in PCT/DK2017/050104, dated Jul. 6, 2017.

China National Intellectual Property Administration, First Notification of Office Action in CN Application No. 201780034647.8, dated Nov. 15, 2019.

* cited by examiner

MULTIROTOR WIND TURBINE

FIELD OF THE INVENTION

The present invention relates to a multirotor wind turbine, i.e. a wind turbine comprising two or more energy generating units arranged on a common tower structure, each energy generating unit comprising a rotor. The multirotor wind turbine according to the invention is capable of reliable self-yawing, even under turbulent wind conditions. Furthermore, according to some of the embodiments of the invention, the multirotor wind turbine provides torque equalization.

BACKGROUND OF THE INVENTION

Wind turbines normally comprise one or more energy generating units, each energy generating unit comprising a rotor comprising a hub carrying one or more wind turbine blades. The wind acts on the wind turbine blades, thereby causing the hub to rotate. The rotational movements of the hub are transferred to a generator, either via a gear arrangement or directly, in the case that the wind turbine is of a so-called direct drive type. In the generator, electrical energy is generated, which may be supplied to a power grid.

Some wind turbines are provided with two or more energy generating units in order to increase the total power produced by the wind turbine, without having to provide the wind turbine with one very large, and therefore heavy, energy generating unit. Such wind turbines are sometimes referred to as 'multirotor wind turbines'.

In multirotor wind turbines the energy generating units may be carried by a load carrying structure which is, in turn, connected to a tower structure. Thereby at least some of the energy generating units are not mounted directly on the tower structure, and they may have a centre of gravity which is displaced with respect to a longitudinal axis defined by the tower structure. When the wind acts on energy generating units mounted in this manner, thrust forces will be created, which will in turn cause loads to be introduced in the load carrying structure, and possibly at connection points between the load carrying structure and the tower structure.

In order to allow the rotors of the energy generating units to be directed into the incoming wind, the load carrying structure(s) may be mounted on the tower structure in a rotatable manner via a yawing arrangement. Thereby the load carrying structure can perform yawing movements relative to the tower structure, thereby ensuring that the rotors are orientated in a correct manner with respect to the incoming wind. The yawing movements may be performed actively, e.g. by means of one or more yawing motors. Alternatively, the yawing system may be of a self-yawing kind which automatically ensures that the rotors are orientated correctly. This may, e.g., be obtained by providing the load carrying structure with a wind vane or the like.

Prior art self-yawing mechanisms are known to operate reliably most of the time. However, under certain conditions, e.g. under turbulent wind conditions, there is a risk that these self-yawing mechanisms suddenly 'flip', i.e. rotate the entire load carrying structure approximately 180°, and the load carrying structure is subsequently slowly rotated into a correct orientation. This introduces undesirable loads on the wind turbine, and the energy production of the wind turbine is reduced while the load carrying structure is rotated into the correct orientation.

EP 2 463 513 A1 discloses a wind power generating device comprising a tower column, a first wind generating set and a second wind generating set. The first wind generating set is installed at a position on the tower column near the top, and generates a first torque on the tower column during rotation for power generation. The second wind generating set is installed at a position on the tower column below the top, and generates a second torque on the tower column which at least partially counteracts the first torque.

JP 2006-322383 discloses a wind power generating device comprising two upwind rotors and a stabilizing fin. The stabilizing fin ensures that the wind generating device is self-yawing.

Examples of multi-rotor wind turbines are further known from GB 2 443 886 A and FR 2 868 483.

DESCRIPTION OF THE INVENTION

It is an object of embodiments of the invention to provide a multirotor wind turbine which is capable of reliable self-yawing, even under turbulent wind conditions.

It is a further object of embodiments of the invention to provide a multirotor wind turbine which provides torque equalization with respect to gravity acting on the energy generating units of the multirotor wind turbine.

It is an even further object of embodiments of the invention to provide a multirotor wind turbine which provides torque equalization with respect to generator torque originating from the rotors of the energy generating units.

The invention provides a multirotor wind turbine comprising a tower structure and at least one load carrying structure, each load carrying structure being arranged for carrying two or more first energy generating units and for being connected to the tower structure, each first energy generating unit comprising a first rotor, and each energy generating unit having a centre of gravity,
wherein at least two of the rotors are downwind and/or upwind rotors, the first energy generating units comprising the at least two first rotors being arranged with their respective centres of gravity at a first distance from the tower structure along a direction of the incoming wind, substantially at the same vertical level, and at opposite sides of the tower structure at substantially the same second distance to the tower structure along a direction substantially perpendicular to the direction of the incoming wind.

For example, at least two of the rotors are downwind rotors, the energy generating units comprising downwind rotors being arranged with their centres of gravity at a first distance behind the tower structure along a direction of the incoming wind, substantially at the same vertical level, and at opposite sides of the tower structure at substantially the same second distance to the tower structure along a direction substantially perpendicular to the direction of the incoming wind. Alternatively, at least two of the first rotors are upwind rotors, the centres of gravity of which are arranged at the first distance in front of the tower structure along the direction of the incoming wind.

Each rotor preferably comprises three blades. Each rotor may preferably constitute a horizontal-axis rotor.

The rotors may be driven at the same RPM, or at different RPM. They may be of the same diameter or different diameters. Choices of RPM and diameter may be made to avoid undesired vibrations, in particular with a view to avoiding resonances.

The present invention relates to a multirotor wind turbine. In the present context the term 'multirotor wind turbine' should be interpreted to mean a wind turbine which comprises two or more energy generating units, each energy generating unit comprising a rotor.

The wind turbine comprises a tower structure and at least one load carrying structure. The tower structure is preferably a substantially vertical structure which is anchored, at a lower part, to a foundation structure. Accordingly, the tower structure resembles a traditional wind turbine tower for a single rotor wind turbine.

Each load carrying structure is arranged for carrying two or more energy generating units and for being connected to the tower structure. Accordingly, a given load carrying structure forms a connection between the two or more energy generating units, carried by the load carrying structure, and the tower structure, and is capable of handling the loads involved with carrying the energy generating units.

In the present context the term 'energy generating unit' should be interpreted to mean a part of the wind turbine which actually transforms the energy of the wind into electrical energy. Each energy generating unit thereby typically comprises a rotor, carrying a set of wind turbine blades, and a generator. The energy generating unit may further comprise a gear arrangement interconnecting the rotor and the generator. The generator, and possibly the gear arrangement, may be arranged inside a nacelle. Each energy generating unit has a centre of gravity.

At least two of the rotors are downwind rotors. In the present context the term 'downwind rotor' should be interpreted to mean a rotor which, during normal operation, is arranged to be positioned at a leeward side of the tower structure. Thus, when the wind turbine is arranged in a correct yaw position, the downwind rotors are arranged behind the tower structure along the direction of the incoming wind.

The at least two energy generating units which comprise downwind rotors are arranged with their centres of gravity at a first distance behind the tower structure along the direction of the incoming wind. Thus, not only the downwind rotors, but also the centres of gravity of the energy generating units comprising the downwind rotors are arranged behind the tower structure along the direction of the incoming wind, i.e. at the leeward side of the tower structure. Furthermore, the centres of gravity of the at least two energy generating units are arranged at a first distance behind the tower structure, i.e. they are arranged at the same distance from the tower structure. In other words, they are arranged in a plane behind the tower structure, the plane extending substantially perpendicularly to the direction of the incoming wind.

Furthermore, the centres of gravity of the two or more energy generating units comprising downwind rotors are arranged substantially at the same vertical level, i.e. substantially at the same height above the ground, or above the sea level in the case that the wind turbine is an offshore wind turbine.

Finally, the centres of gravity of the two or more energy generating units comprising downwind rotors are arranged at opposite sides of the tower structure at substantially the same second distance to the tower structure along a direction being substantially perpendicular to the direction of the incoming wind.

When the wind turbine performs yawing movements in order to orient the rotors of the energy generating units correctly with respect to the incoming wind, a part of the wind turbine, for instance the load carrying structure, is normally rotated about a rotational axis which coincides with a longitudinal direction defined by the tower structure. Accordingly, arranging the centres of gravity of the two or more energy generating units at the first distance behind the tower structure as described above, ensures that the centres of gravity are behind the rotation axis of the yawing movements, along the direction of the incoming wind. Accordingly, the point of attack of thrust forces acting on these energy generating units are also arranged behind the axis of rotation of the yawing movements, along the direction of the incoming wind. This causes the wind turbine to be self-yawing, i.e. the wind turbine is automatically moved to a correct yaw position with respect to the incoming wind. Furthermore, the self-yawing is stable and reliable, even under turbulent wind conditions, since this arrangement of the energy generating units prevents that the yawing mechanism suddenly 'flips' in the manner described above.

Arranging the centres of gravity of the energy generating units comprising downwind rotors substantially at the same vertical level and at opposite sides of the tower structure at substantially the same second distance to the tower structure along the direction substantially perpendicular to the direction of the incoming wind, ensures that the loads on the load carrying structure originating from gravity acting on the energy generating units are balanced. This even further stabilizes the self-yawing mechanism.

It is particularly advantageous to provide multirotor wind turbines with a reliable self-yawing mechanism, because for multirotor wind turbines the yaw torque applied to the tower can potentially be very large and require a very strong traditional yaw system, as well as a tower which can handle the torque without reinforcement. This increases the manufacturing costs. Accordingly, a self-yawing multirotor wind turbine construction is interesting because it eliminates the cost of an active yaw mechanism and allows for a smaller tower diameter than would be required if a traditional, active yawing mechanism was applied.

At least one of the at least one load carrying structure may be arranged to carry at least one second energy generating unit, the at least one second energy generating unit being in that case an upwind rotor if the at least two first rotors are downwind rotors, and the at least one second energy generating unit being a downwind rotor if the at least two first rotors are upwind rotors, the centre of gravity of at least one of the second energy generating units being arranged at a third distance from the tower structure along the direction of the incoming wind. The centre of gravity of at least one of the second energy generating units may be arranged at a vertical level which differs from the vertical level of at least one of the at least two first energy generating unit.

The one or more second energy generating units, also referred to herein as further energy generating units, may generally comprise downwind rotors, having their centres of gravity arranged in a different manner with respect to the tower structure than what is described above, as long as at least two of the energy generating units are arranged as described above. For instance, such additional energy generating units could be arranged with their centres of gravity at a different vertical level and/or with a different distance to the tower structure along the direction of the incoming wind and/or along the direction substantially perpendicular to the incoming wind.

At least one load carrying structure may be arranged to carry at least one further energy generating unit, at least one of the further energy generating units comprising an upwind rotor and the centre of gravity of the energy generating unit being arranged at a third distance in front of the tower structure along the direction of the incoming wind.

Thus, according to this embodiment, the wind turbine comprises at least two energy generating units comprising downwind rotors and at least one energy generating unit comprising an upwind rotor. In another embodiment the wind turbine comprises at least two energy generating units comprising upwind rotors and at least one energy generating unit comprising a downwind rotor. In the present context the term 'upwind rotor' should be interpreted to mean a rotor which, during normal operation, is arranged to be positioned at an upwind side of the tower structure. Thus, when the wind turbine is arranged in a correct yaw position, the one more upwind rotors are arranged in front of the tower structure along the direction of the incoming wind.

Since the at least one or least two energy generating unit(s) comprising downwind rotor(s) is/are arranged with their centres of gravity behind the tower structure, along the direction of the incoming wind, and the at least one energy generating unit comprising an upwind rotor is/are arranged with its/their centre(s) of gravity in front of the tower structure, along the direction of the incoming wind, it is possible to balance torque introduced in the load carrying structure and/or being transferred from the load carrying structure to the tower structure, along the direction of the incoming wind, due to gravity acting on the energy generating units.

In order to balance the torque along the direction of the incoming wind, as described above, the first distance and the third distance may be selected in an appropriate manner. For instance, assuming that the masses of the energy generating units are substantially identical, in the case that a given load carrying structure carries two energy generating units comprising downwind rotors and one energy generating unit comprising an upwind rotor, the third distance may advantageously be approximately twice the first distance. Similarly, if a given load carrying structure carries two energy generating units comprising downwind rotors and two energy generating units comprising upwind rotors, the third distance may advantageously be approximately equal to the first distance.

Furthermore, the one or more energy generating units comprising upwind rotors may be arranged in such a manner that the one or more energy generating units comprising downwind rotors are not arranged in its/their wake. For instance, the energy generating unit(s) comprising upwind rotor(s) may be arranged directly in front of the tower structure.

The centre of gravity of the energy generating unit(s) comprising at least one upwind rotor may be arranged at a vertical level which differs from the vertical level of the at least one or at least two energy generating units comprising downwind rotors. Thereby it is ensured that the energy generating units comprising downwind rotors are arranged out of the wake of the energy generating unit comprising an upwind rotor. At least one load carrying structure may be arranged to carry at least two second energy generating units, the at least two second energy generating units carrying upwind rotors if said at least two first rotors are downwind rotors, and the at least two second energy generating units carrying downwind rotors if said at least two first rotors are upwind rotors, the at least two second energy generating units being arranged with their centres of gravity in a common vertical plane extending substantially perpendicularly to the direction of the incoming wind, at the third distance from the tower structure along the direction of the incoming wind. For example, at least one load carrying structure may be arranged to carry at least two further energy generating units comprising upwind rotors, the at least two further energy generating units being arranged with their centres of gravity in a common vertical plane extending substantially perpendicularly to the direction of the incoming wind, at the third distance in front of the tower structure along the direction of the incoming wind.

According to such embodiments, at least one of the load carrying structures carries at least two energy generating units comprising downwind rotors and at least two energy generating units comprising upwind rotors. The energy generating units comprising downwind rotors are preferably arranged with their centres of gravity behind the tower structure, in a common horizontal plane, and the energy generating units comprising upwind rotors are arranged with their centres of gravity in front of the tower structure, in a common vertical plane. Accordingly, the energy generating units comprising upwind rotors may be arranged, one above the other, in front of the tower structure. For instance, the energy generating units comprising upwind rotors may be arranged directly in front of the tower structure, as described above.

At least one first and/or second energy generating unit comprising an upwind rotor may be arranged with its centre of gravity above the vertical level of at least one first and/or second energy generating unit comprising a downwind rotor, and at least one first and/or second energy generating unit comprising an upwind rotor is arranged with its centre of gravity below the vertical level of at least one first and/or second energy generating unit comprising a downwind rotor. For example, at least one energy generating unit comprising an upwind rotor may be arranged with its centre of gravity above the vertical level of the energy generating units comprising downwind rotors, and at least one energy generating unit comprising an upwind rotor may be arranged with its centre of gravity below the vertical level of the energy generating units comprising downwind rotors.

According to these embodiments, the torque introduced in the load carrying structure, due to the rotation of the rotors, is also balanced.

The positions of the centres of gravity for two first and/or second energy generating units comprising downwind rotors and two first and/or second energy generating units comprising upwind rotors may form corners of a regular tetrahedron. For example, the positions of the centres of gravity for two energy generating units comprising downwind rotors and two energy generating units comprising upwind rotors may form corners of a regular tetrahedron. Thereby, a stable construction is achieved, which ensures that torque introduced in the load carrying structure, due to gravity acting on the energy generating units as well as due to rotation of the rotors, is balanced. The tetrahedron-outline of the wind turbine may be more robust to yaw changes and wind gusts than other configurations.

At least one load carrying structure may arranged to carry at least three first and/or second energy generating units comprising a downwind rotor and at least two first and/or second energy generating units comprising an upwind rotor. The load carrying structure may comprise at least three arms, each arm carrying a first and/or second energy generating unit comprising a downwind rotor and a first and/or second energy generating unit comprising an upwind rotor, and each arm being connected to the tower structure via a common connecting part. In one such embodiment, at least one load carrying structure may be arranged to carry at least three energy generating units comprising a downwind rotor and at least three energy generating units comprising an upwind rotor, and the load carrying structure may comprise at least three arms, each arm carrying an energy generating unit comprising a downwind rotor and an energy generating unit comprising an upwind rotor, and each arm being connected to the tower structure via a common connecting part.

According to such embodiments, each of the arms of the load carrying structure carries two energy generating units, i.e. one energy generating unit comprising a downwind rotor and one energy generating unit comprising an upwind rotor. Thereby the torque introduced in a given arm, due to rotation of the rotors of the energy generating units, will balance at a position along the length of the arm which is approximately half way between the attachment points of the two energy generating units. Furthermore, the torque introduced in the arm, due to gravity acting on the energy generating units will also balance at this position. Accordingly, if the arms are connected to the common connecting part at this position along the lengths of the arms, the torque transfer from the arms to the tower structure is minimised. Accordingly, the loads introduced in the common connecting part as well as in the tower structure are minimised.

At least one load carrying structure may comprise at least two primary structures and at least two secondary structures, and gravity acting on the energy generating units being carried by the load carrying structure may cause push in the primary structures and pull in the secondary structures.

According to this embodiment, the secondary structures are automatically preloaded, due to gravity acting on the energy generating units. The preloading of the secondary structures ensures that these structures are capable of handling loads originating from thrust of the energy generating units. In the case that two secondary structures extend on opposing sides of the primary structures, thrust loads acting in one direction will increase the pull in a first secondary structure and decrease the pull in the second secondary structure, while thrust loads acting in an opposite direction will decrease the pull in the first secondary structure and increase the pull in the second secondary structure. However, the preload in the secondary structures ensures that a certain pull remains in each of the secondary structures, also when the pull is decreased, due to the thrust loads. The two opposing directions could, e.g., be the direction of the incoming wind and the opposite direction.

The primary structures may be in the form of one or more compression bars. Compression bars are suitable for receiving push. The compression bars could, e.g., be in the form of tubes, rods, beams, such as I-beams, etc.

The secondary structures may be in the form of one or more tension members. Tension members are suitable for receiving pull. The tension members could, e.g., be in the form bars or carbon fibre structures, or in the form of flexible members, such as wires, ropes, etc.

Further Aspects of the Invention

Further aspects of the invention are defined by the following clauses, the reference signs placed in parentheses being provided for information purposes only, it being understood that neither the reference signs nor the appended drawings are limiting upon the scope of the clauses:

1. A multirotor wind turbine (1) comprising a tower structure (2) and at least one load carrying structure (3, 4), each load carrying structure (3, 4) being arranged for carrying two or more energy generating units (5, 7) and for being connected to the tower structure (2), each energy generating unit (5, 7) comprising a rotor (6, 8), and each energy generating unit (5, 7) having a centre of gravity, wherein at least two of the rotors are downwind rotors (6), the energy generating units (5) comprising downwind rotors (6) being arranged with their centres of gravity at a first distance behind the tower structure (2) along a direction of the incoming wind, substantially at the same vertical level, and at opposite sides of the tower structure (2) at substantially the same second distance to the tower structure (2) along a direction substantially perpendicular to the direction of the incoming wind.

2. A multirotor wind turbine (1) according to clause 1, wherein at least one load carrying structure (3, 4) is arranged to carry at least one further energy generating unit (7), at least one of the further energy generating units (7) comprising an upwind rotor (8) and the centre of gravity of the energy generating unit (7) being arranged at a third distance in front of the tower structure (2) along the direction of the incoming wind.

3. A multirotor wind turbine (1) according to clause 2, wherein the centre of gravity of the energy generating unit (7) comprising an upwind (8) rotor is arranged at a vertical level which differs from the vertical level of the at least two energy generating units (5) comprising downwind rotors (6).

4. A multirotor wind turbine (1) according to clause 2 or 3, wherein at least one load carrying structure (3, 4) is arranged to carry at least two further energy generating units (7) comprising upwind rotors (8), the at least two further energy generating units (7) being arranged with their centres of gravity in a common vertical plane extending substantially perpendicularly to the direction of the incoming wind, at the third distance in front of the tower structure (2) along the direction of the incoming wind.

5. A multirotor wind turbine (1) according to clause 4, wherein at least one energy generating unit (7) comprising an upwind rotor (8) is arranged with its centre of gravity above the vertical level of the energy generating units (5) comprising downwind rotors (6), and at least one energy generating unit (7) comprising an upwind rotor (8) is arranged with its centre of gravity below the vertical level of the energy generating units (5) comprising downwind rotors (6).

6. A multirotor wind turbine (1) according to clause 4 or 5, wherein the positions of the centres of gravity for two energy generating units (5) comprising downwind rotors (6) and two energy generating units (7) comprising upwind rotors (8) form corners of a regular tetrahedron.

7. A multirotor wind turbine (1) according to any of the preceding clauses, wherein at least one load carrying structure (3, 4) is arranged to carry at least three energy generating units (5) comprising a downwind rotor (6) and at least three energy generating units (7) comprising an upwind rotor (8), and wherein the load carrying structure comprises at least three arms (3), each arm (3) carrying an energy generating unit (5) comprising a downwind rotor (6) and an energy generating unit (7) comprising an upwind rotor (8), and each arm (3) being connected to the tower structure (2) via a common connecting part.

8. A multirotor wind turbine (1) according to any of the preceding clauses, wherein at least one load carrying structure comprises at least two primary structures (3) and at least two secondary structures (4), and wherein gravity acting on the energy generating units (5, 7) being carried by the load carrying structure (3, 4) causes push in the primary structures (3) and pull in the secondary structures (4).

9. A multirotor wind turbine (1) according to clause 8, wherein the primary structures (3) are in the form of one or more compression bars.

10. A multirotor wind turbine (1) according to clause 8 or 9, wherein the secondary structures (4) are in the form of one or more tension members.

BRIEF DESCRIPTION OF THE DRAWINGS

The invention will now be described in further detail with reference to the accompanying drawings in which.

DETAILED DESCRIPTION OF THE DRAWINGS

Figure 1:
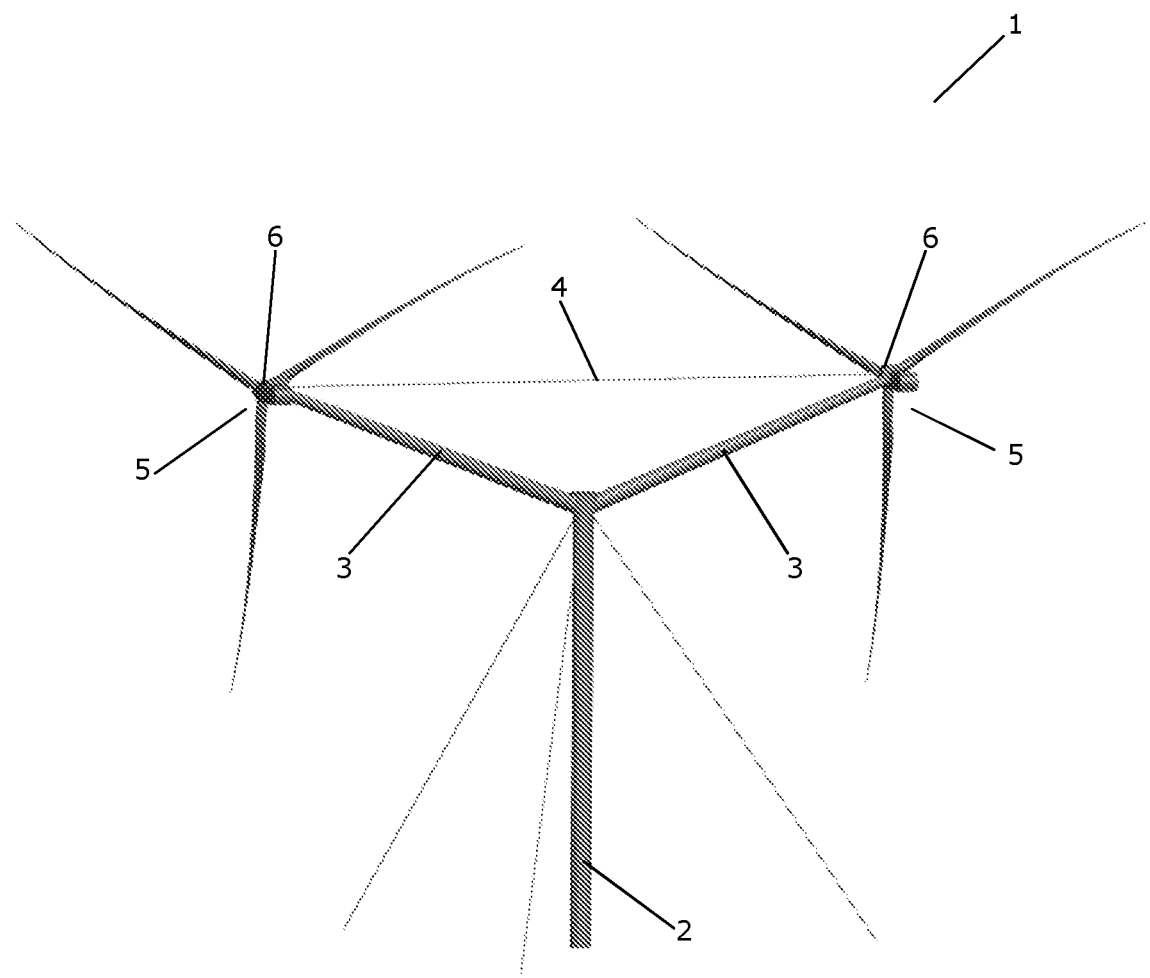
FIG. 1 is a perspective view of a multirotor wind turbine according to a first embodiment of the invention.

FIG. 1 is a perspective view of a multirotor wind turbine 1 according to a first embodiment of the invention. The multirotor wind turbine 1 comprises a tower structure 2 and a load carrying structure in the form of two arms 3 extending away from the tower structure 2, and a wire 4. Each of the arms 3 carries an energy generating unit 5, and the wire 4 interconnects the energy generating units 5 or the parts of the arms 3 which carry the energy generating units 5. The entire load carrying structure 3, 4 is arranged to perform yawing movements with respect to the tower structure 2 about an axis of rotation which is substantially coinciding with a longitudinal axis defined by the tower structure 2, via a yawing mechanism (not shown). Thereby the energy generating units 5 can be orientated in a correct manner with respect to the incoming wind.

Each energy generating unit 5 comprises a downwind rotor 6, and each energy generating unit 5 has a centre of gravity. The centres of gravity for both of the energy generating units 5 are arranged at a first distance behind the tower structure 2, along the direction of the incoming wind, i.e. at the leeward side of the tower structure 2. Accordingly, the points of attack of thrust forces acting on the energy generating units 5 are arranged behind the tower structure 2, and thereby behind the axis of rotation for the yawing movements of the load carrying structure 3, 4.

Furthermore, the centres of gravity of the energy generating units 5 are arranged substantially at the same vertical level, and at opposite sides of the tower structure 2, at a second distance from the tower structure 2, along a direction substantially perpendicular to the incoming wind. Accordingly, the distances from each of the energy generating units 5 to the tower structure 2, along the direction perpendicular to the direction of the incoming wind, are substantially identical.

The mutual positions of the energy generating units 5 and the tower structure 2 ensure that the load carrying structure 3, 4 is capable of performing self-yawing movements relative to the tower structure 2, in a stable and reliable manner, even under turbulent wind conditions.

The arms 3 are relatively stiff, while the wire 4 is relatively flexible. Accordingly, gravity acting on the energy generating units 5 causes push in the arms 3 and pull in the wire 4.

Figure 2A:
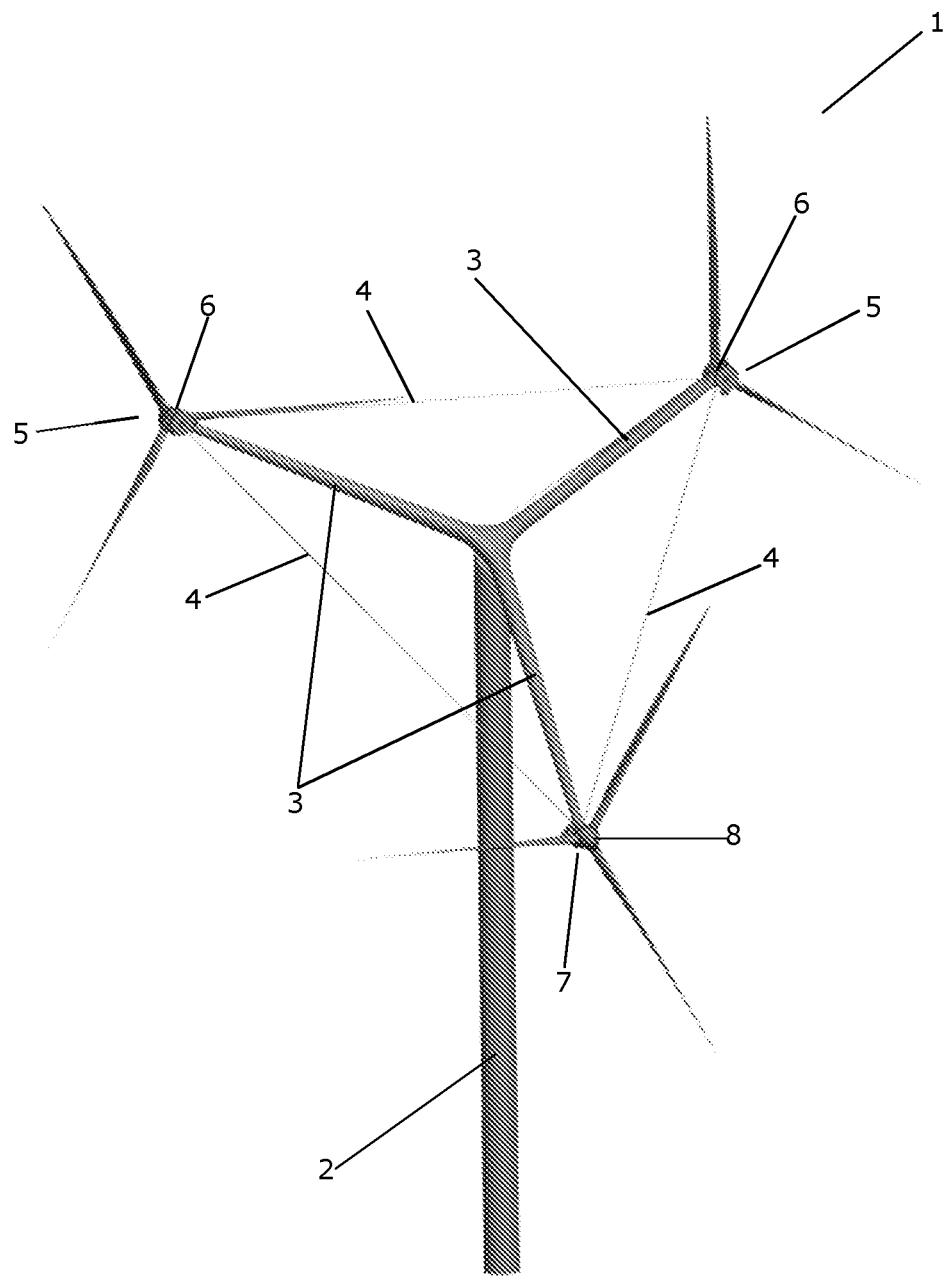
FIGS. 2a and 2b are perspective views of a multirotor wind turbine according to a second embodiment of the invention.
Figure 2B:
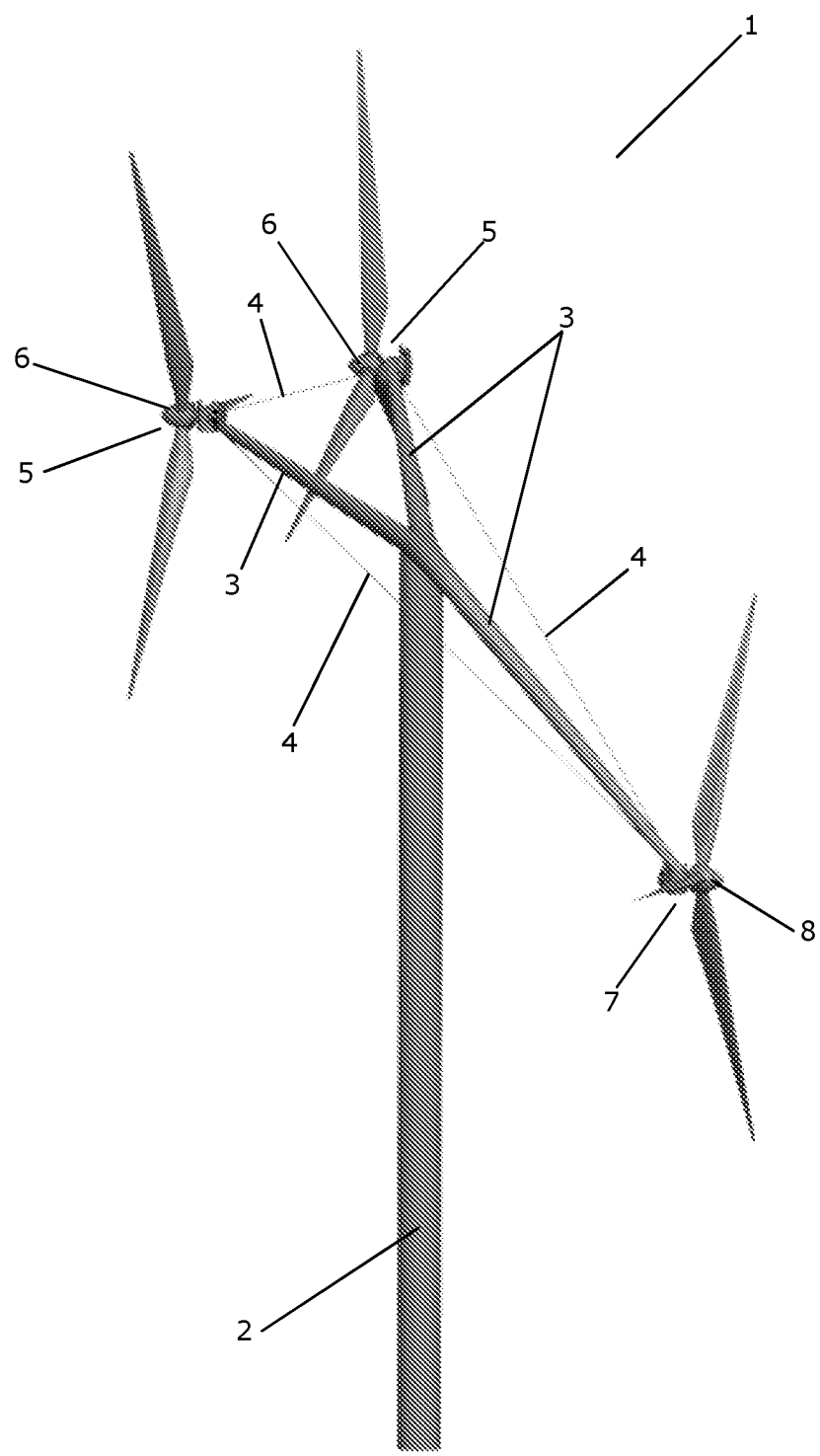

FIGS. 2a and 2b are perspective views of a multirotor wind turbine 1 according to a second embodiment of the invention, seen from two different angles. The multirotor wind turbine 1 of FIGS. 2a and 2b is similar to the multirotor wind turbine 1 of FIG. 1 in that it comprises a tower structure 2 and a load carrying structure 3, 4, carrying two energy generating units 5, each comprising a downwind rotor 6. Furthermore, the mutual positions of the energy generating units 5 and the tower structure 2 are essentially as described above with reference to FIG. 1.

In the embodiment illustrated in FIGS. 2a and 2b, the load carrying structure comprises three arms 3 and three wires 4. Two of the arms 3 carry energy generating units 5 comprising downwind rotors 6, as described above with reference to FIG. 1. Accordingly, the load carrying structure 3, 4 is also in this case capable of performing self-yawing in a reliable and stable manner, even under turbulent wind conditions.

The third arm 3 carries a further energy generating unit 7 comprising an upwind rotor 8. The three wires 4 each interconnects two of the energy generating units 5, 7. The centre of gravity of the further energy generating unit 7 is arranged at a third distance in front of the tower structure 2 along the direction of the incoming wind. Furthermore, the centre of gravity of the further energy generating unit 7 is arranged at a lower vertical level than the centres of gravity of the two energy generating units 5 comprising downwind rotors 6.

The third distance is substantially twice the first distance. Accordingly, the torque introduced in the load carrying structure 3, 4, due to gravity acting on the energy generating units 5, 7, is balanced at the point where the arms 3 are connected to the tower structure 2.

Since the centre of gravity of the energy generating unit 7 comprising an upwind rotor 8 is arranged at a different vertical level than the centres of gravity of the energy generating units 5 comprising downwind rotors 6, it is ensured that the downwind rotors 6 are arranged substantially out of the wake of the upwind rotor 8. Accordingly, the total energy production of the multirotor wind turbine 1 is maximised.

Figure 3A:
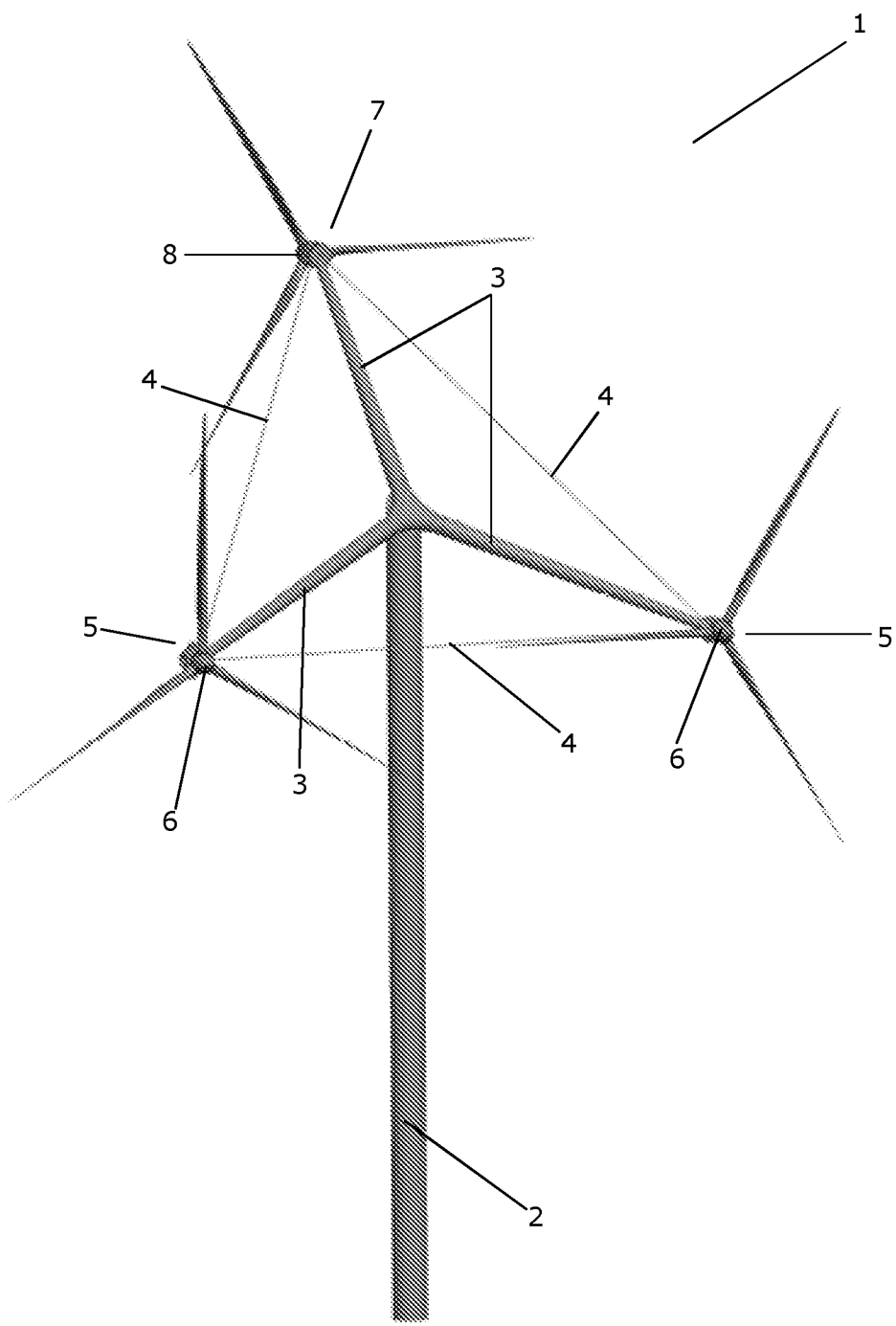
FIGS. 3a and 3b are perspective views of a multirotor wind turbine according to a third embodiment of the invention.
Figure 3B:
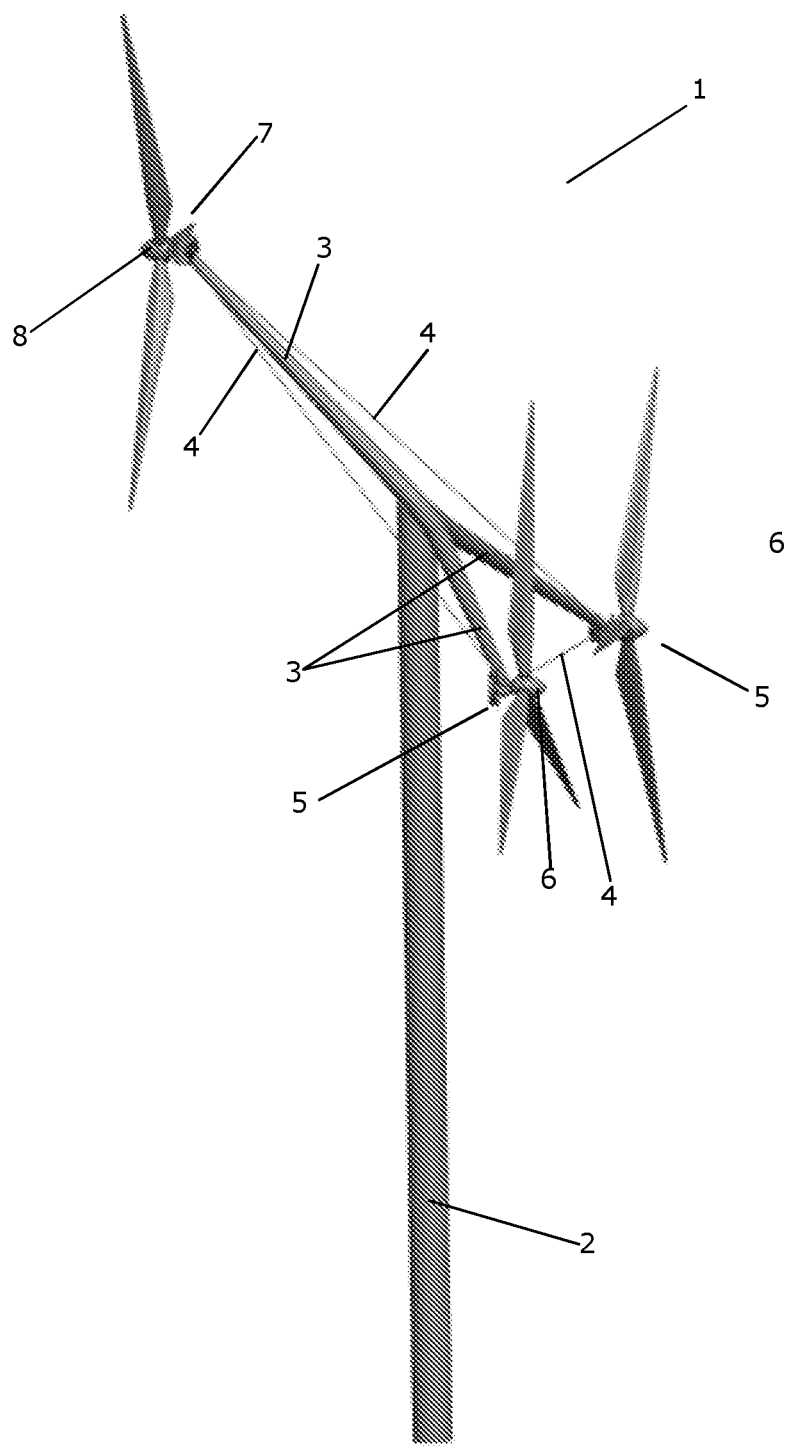

FIGS. 3a and 3b are perspective views of a multirotor wind turbine 1 according to a third embodiment of the invention, seen from two different angles. The multirotor wind turbine 1 of FIGS. 3a and 3b is very similar to the multirotor wind turbine 1 of FIGS. 2a and 2b, and it will therefore not be described in further detail here.

However, in the multirotor wind turbine 1 of FIGS. 3a and 3b, the centre of gravity of the energy generating unit 7 comprising an upwind rotor 8 is arranged at a higher vertical level than the centres of gravity of the energy generating units 5 comprising downwind rotors 6. However, the remarks set forth above with reference to FIGS. 2a and 2b are equally applicable here.

Figure 4A:
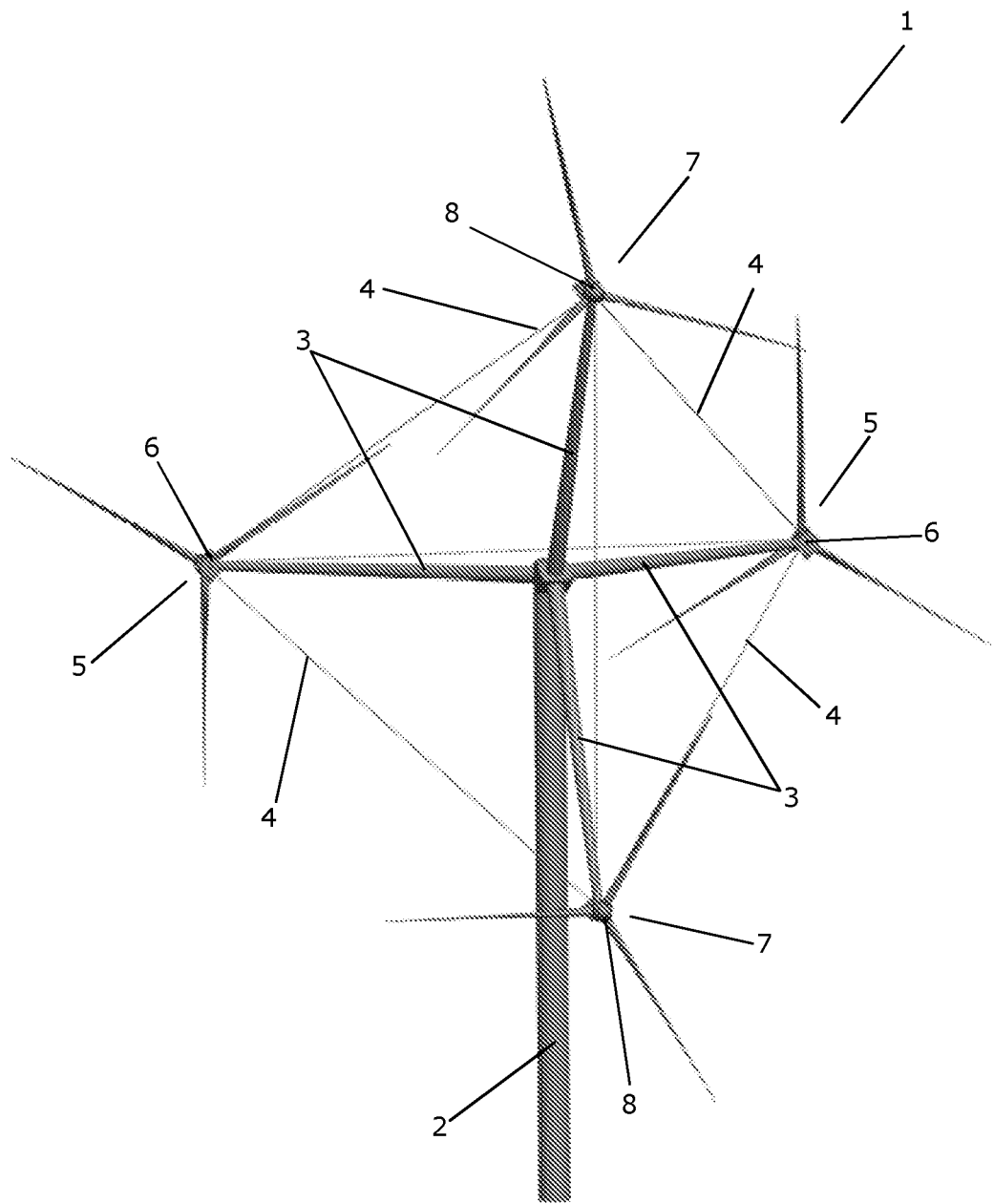
FIGS. 4a and 4b are perspective views of a multirotor wind turbine according to a fourth embodiment of the invention.
Figure 4B:
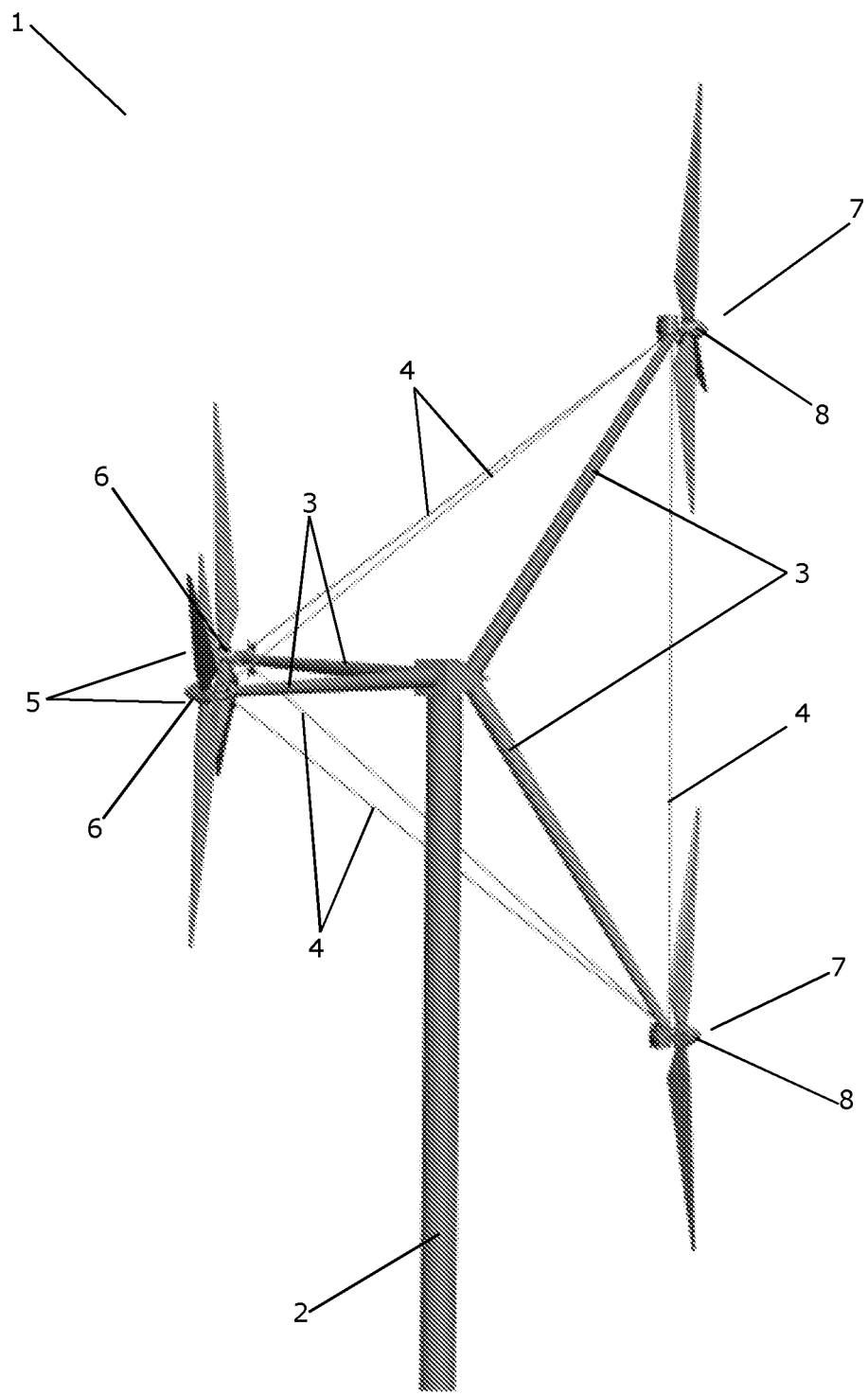

FIGS. 4a and 4b are perspective views of a multirotor wind turbine 1 according to a fourth embodiment of the invention, seen from two different angles. Similarly to the first, second and third embodiments described above, the multirotor wind turbine 1 of FIGS. 4a and 4b comprises a tower structure 2 and a load carrying structure 3, 4 carrying two energy generating units 5, each comprising a downwind rotor 6. The mutual positions of the energy generating units 5 comprising downwind rotors 6 and the tower structure 2 are essentially as described above with reference to FIG. 1. Accordingly, the load carrying structure 3, 4 is, also in this case, capable of performing self-yawing movements with respect to the tower structure 2, in a stable and reliable manner, even under turbulent wind conditions.

The load carrying structure of the multirotor wind turbine 1 of FIGS. 4a and 4b comprises four arms 3 and six wires 4. Two of the arms 3 carry the energy generating units 5 comprising downwind rotors 6. The other two arms 3 each carry an energy generating unit 7 comprising an upwind rotor 8. The wires 4 interconnect each of the energy generating units 5, 7 to the other three energy generating units 5, 7.

The centres of gravity of the energy generating units 7 comprising upwind rotors 8 are arranged, one above the other, in a common vertical plane. One of the energy generating units 7 is arranged above the vertical level of the energy generating units 5 comprising downwind rotors 6, and the other energy generating unit 7 is arranged below this vertical level.

The first distance, i.e. the distance from the tower structure 2 to the centres of gravity of the energy generating units 5 comprising downwind rotors 6, along the direction of the incoming wind, is substantially identical to the third distance, i.e. the distance from the tower structure 2 to the centres of gravity of the energy generating units 7 comprising upwind rotors 8, along the direction of the incoming wind. Thereby it is ensured that the torque introduced in the load carrying structure 3, 4, due to gravity acting on the energy generating units 5, 7, is balanced at the point where the arms 3 are connected to the tower structure 2.

Since the multirotor wind turbine 1 comprises two downwind rotors 6 and two upwind rotors 8, the torque introduced in the load carrying structure 3, 4, due to the rotation of the rotors 6, 8, is balanced at the position where the arms 3 are connected to the tower structure 2. Accordingly, the loads transferred from the arms 3 to the tower structure 2 are minimised.

The four energy generating units 5, 7 are positioned in such a manner that the positions of their centres of gravity form the corners of a regular tetrahedron. This is a very stable construction, which ensures that torque introduced in the load carrying structure 3, 4, due to gravity acting on the energy generating units 5, 7 as well as due to rotation of the rotors 6, 8, is balanced.

Figure 5A:
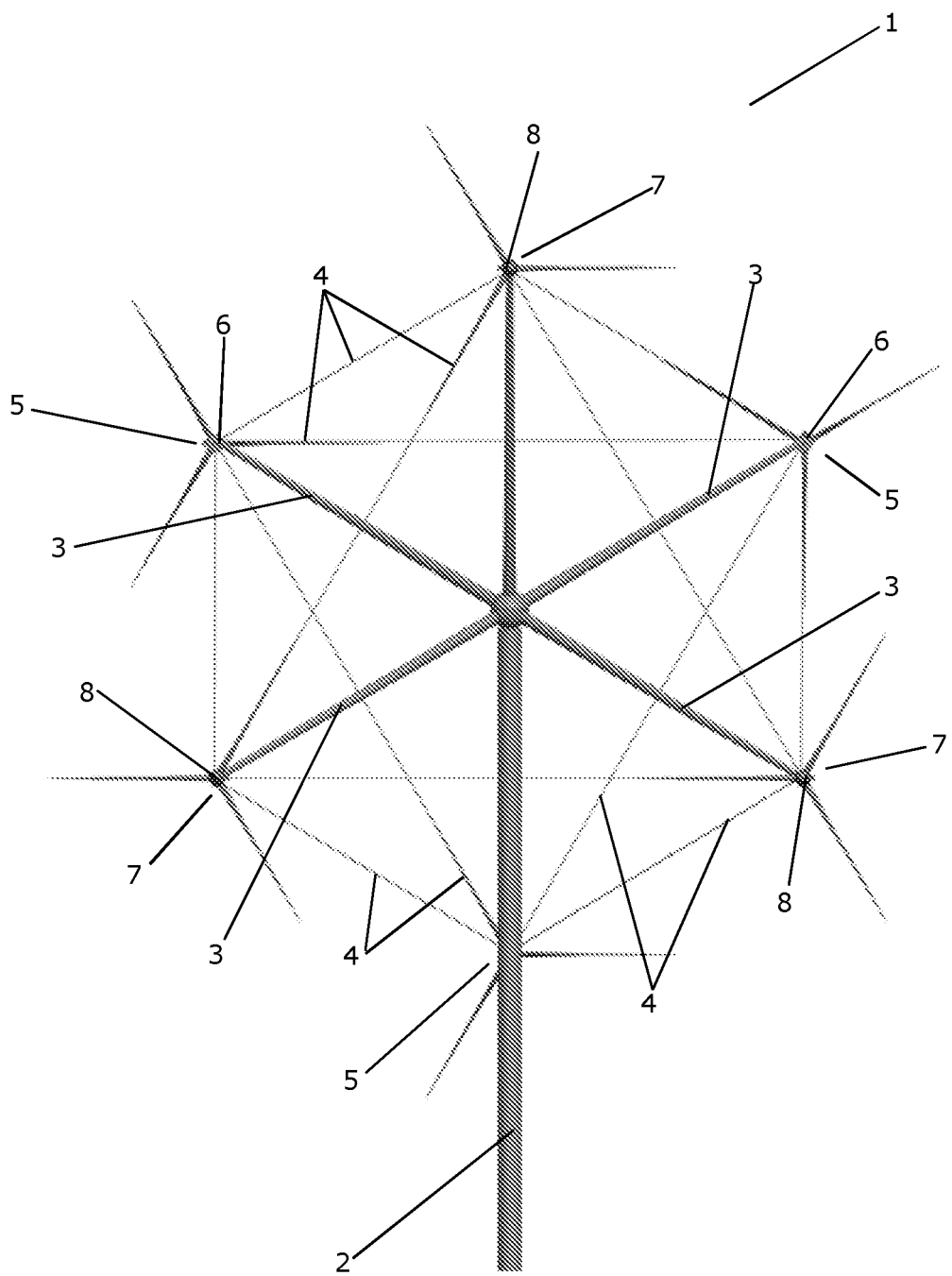
FIGS. 5a and 5b are perspective views of a multirotor wind turbine according to a fifth embodiment of the invention.
Figure 5B:
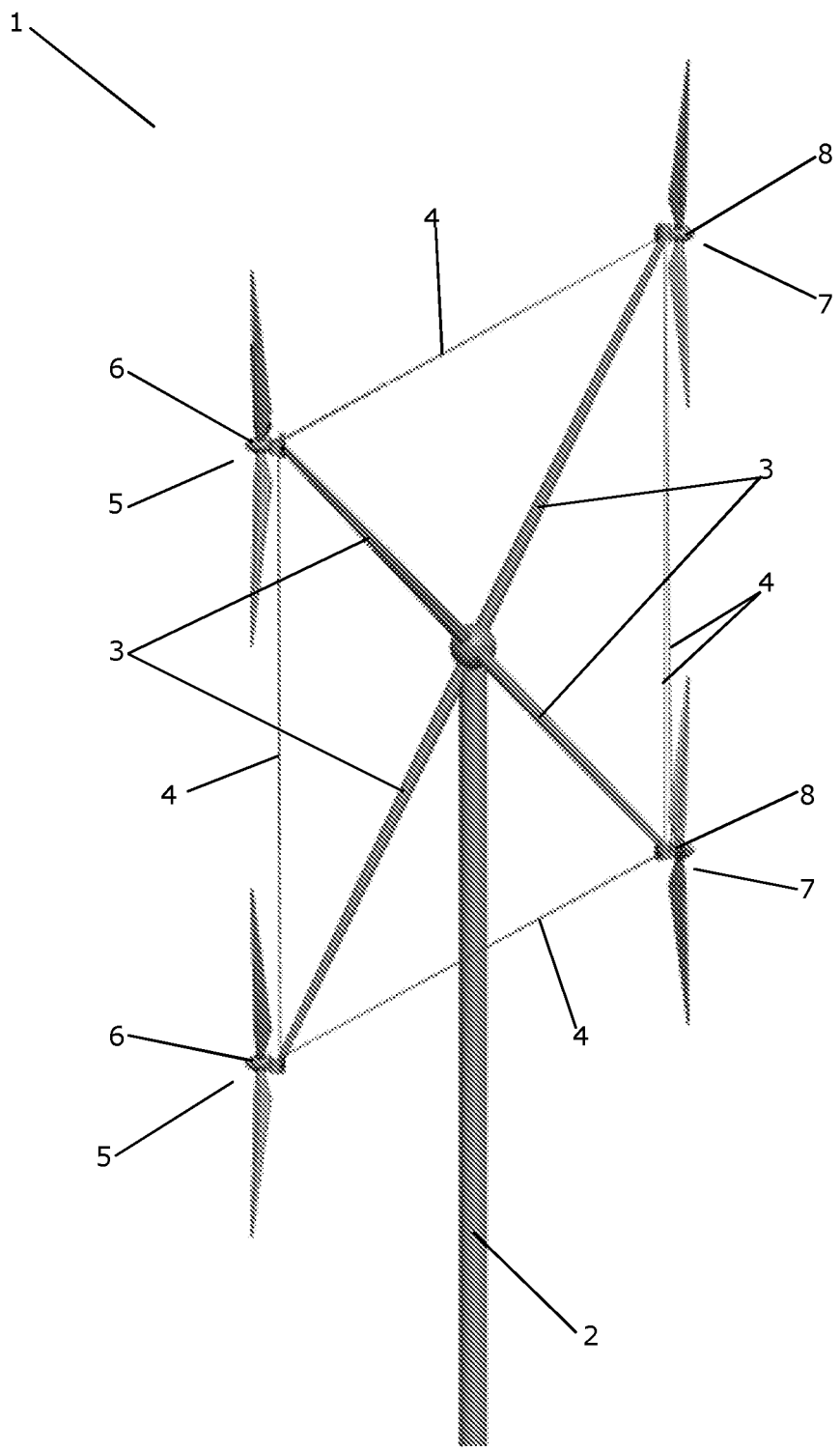

FIGS. 5a and 5b are perspective views of a multirotor wind turbine 1 according to a fifth embodiment of the invention, seen from two different angles. The multirotor wind turbine 1 comprises a tower structure 2 and a load carrying structure comprising three arms 3 and a number of wires 4.

Each of the arms 3 carries an energy generating unit 5 comprising a downwind rotor 6 and an energy generating unit 7 comprising an upwind rotor 8. Accordingly, the multirotor wind turbine 1 comprises three energy generating units 5 comprising downwind rotors 6 and three energy generating units 7 comprising upwind rotors 8. The arms 3 are connected to the tower structure 2 at a common point of connection.

The centres of gravity of all of the energy generating units 5 comprising downwind rotors 6 are arranged in a common vertical plane, at a first distance behind the tower structure 2, along the direction of the incoming wind. Similarly, the centres of gravity of all of the energy generating units 7 comprising upwind rotors 8 are arranged in a common vertical plane, at a third distance in front of the tower structure 2, along the direction of the incoming wind. The first distance is substantially identical to the third distance. Thereby the torque introduced in the load carrying structure 3, 4, due to gravity acting on the energy generating units 5, 7, is balanced at the position where the arms 3 are connected to the tower structure 2.

Furthermore, since each of the arms 3 carries an energy generating unit 5 comprising a downwind rotor 6 and an energy generating unit 7 comprising an upwind rotor 8, the torque introduced in each of the arms 3, due to the rotation of the rotors 6, 8, is also balanced at the position where the arm 3 is connected to the tower structure 2. Accordingly, the load transfer from the arms 3 to the tower structure 2 is minimised.

Finally, the load carrying structure 3, 4 is capable of performing self-yawing movements relative to the tower structure 2, in a stable and reliable manner, even under turbulent wind conditions, for the reasons set forth above.

Figure 6A:
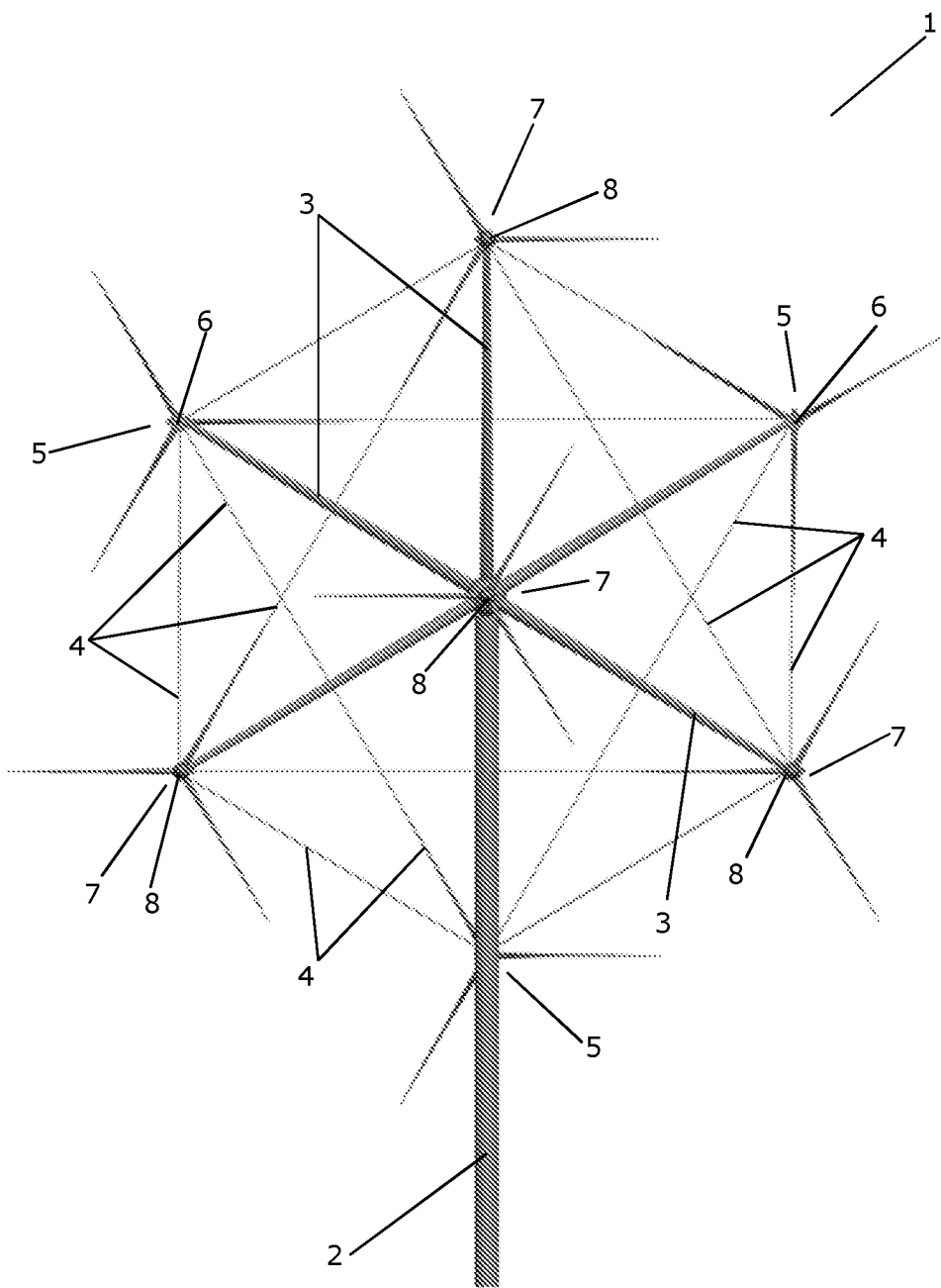
FIGS. 6a and 6b are perspective views of a multirotor wind turbine according to a sixth embodiment of the invention.
Figure 6B:
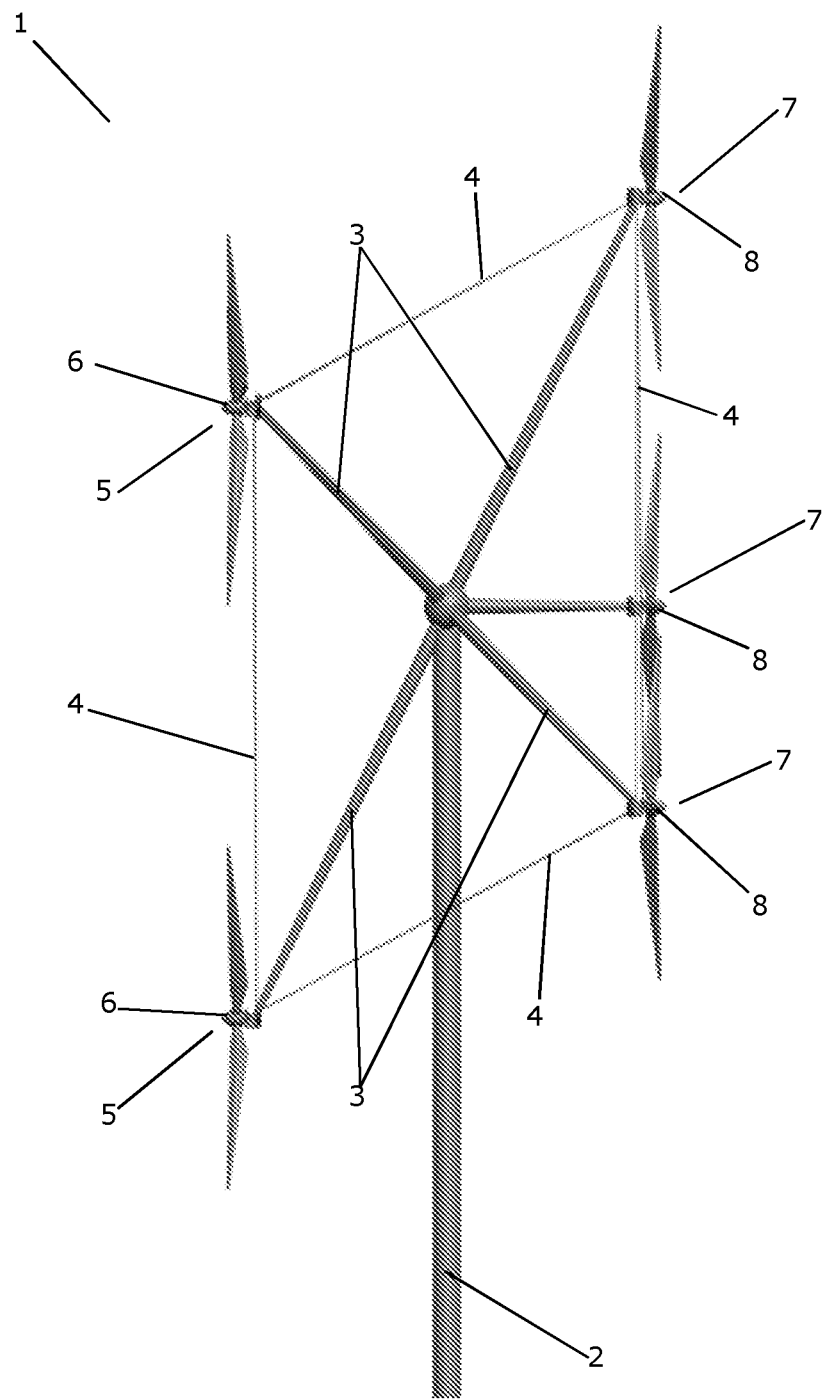

FIGS. 6a and 6b are perspective views of a multirotor wind turbine 1 according to a sixth embodiment of the invention, seen from two different angles.

The multirotor wind turbine 1 of FIGS. 6a and 6b is very similar to the multirotor wind turbine 1 of FIGS. 5a and 5b, and it will therefore not be described in further detail here.

However, the multirotor wind turbine 1 of FIGS. 6a and 6b comprises an additional energy generating unit 7 comprising an upwind rotor 8. This energy generating unit 7 is arranged directly in front of the tower structure 2, along the direction of the incoming wind, and with its centre of gravity at a vertical level corresponding to the vertical level of the common point of connection between the arms 3 and the tower structure 2. Thereby the total power production of the multirotor wind turbine 1 is increased without risking that any of the downwind rotors 6 are arranged in the wake of the additional upwind rotor 8.

FIGS. 7a-7d are schematic illustrations of configurations of energy generating units. The configurations shown in FIGS. 7a and 7c comprises one downwind rotor 6 and two upwind rotors 8. The configuration shown in FIG. 7d comprises two downwind rotors 6 and two upwind rotors 8, mounted on respective arms 3. As shown, the pair of arms 3 supporting the upwind rotors 8 may be mounted to and supported by a first tow structure 2, whereas the pair of arms 3 supporting the downwind rotors 6 may be mounted to and supported by a second structure 2. Alternatively, both pairs of arms 3 may be mounted to and supported by one and the same tower structure 2.

Figure 7D:
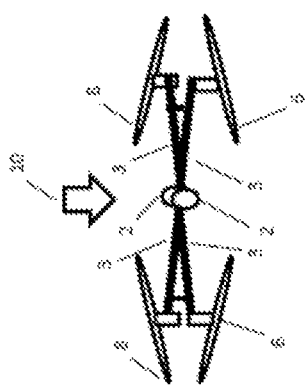
FIGS. 7a-7d are schematic illustrations of configurations of energy generating units.
Figure 7C:
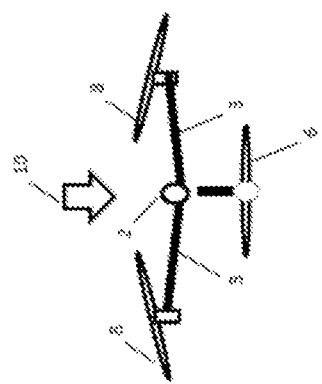
Figure 7B:

FIG. 7b illustrates a side view of the configuration of FIG. 7c.

Figure 7A:
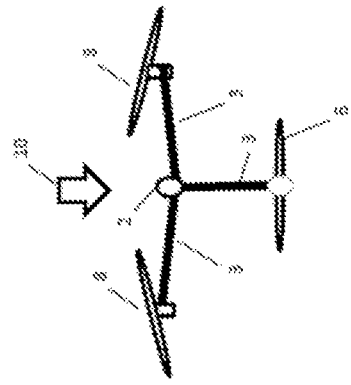

In FIGS. 7a, 7c and 7d, the direction of the incoming wind is illustrated by arrow 10.

The invention claimed is:

1. A multirotor wind turbine comprising a tower structure and at least one load carrying structure, each load carrying structure being arranged for carrying two or more first energy generating units and for being connected to the tower structure, each first energy generating unit comprising a first rotor, and each first energy generating unit having a centre of gravity, wherein at least two of the first rotors are downwind rotors, the first energy generating units comprising the at least two downwind rotors being arranged with their respective centres of gravity at a first distance from the tower structure along a direction of the incoming wind, substantially at the same vertical level, and at opposite sides of the tower structure at substantially the same second distance to the tower structure along a direction substantially perpendicular to the direction of the incoming wind.

2. The multirotor wind turbine according to claim 1, wherein at least one of the at least one load carrying structure is arranged to carry at least one second energy generating unit, the at least one second energy generating unit being an upwind rotor, the centre of gravity of at least one of the second energy generating units being arranged at a third distance from the tower structure along the direction of the incoming wind.

3. The multirotor wind turbine according to claim 2, wherein the centre of gravity of at least one of said second energy generating units is arranged at a vertical level which differs from the vertical level of at least one of said at least two first energy generating unit.

4. The multirotor wind turbine according to claim 2, wherein at least one load carrying structure is arranged to carry at least two second energy generating units, the at least two second energy generating units carrying upwind rotors, the at least two second energy generating units being arranged with their centres of gravity in a common vertical plane extending substantially perpendicularly to the direction of the incoming wind, at the third distance from the tower structure along the direction of the incoming wind.

5. The multirotor wind turbine according to claim 4, wherein at least one second energy generating unit comprising an upwind rotor is arranged with its centre of gravity above the vertical level of at least one first energy generating unit comprising a downwind rotor, and at least one second energy generating unit comprising an upwind rotor is arranged with its centre of gravity below the vertical level of at least one first energy generating unit comprising a downwind rotor.

6. The multirotor wind turbine according to claim 4, wherein the positions of the centres of gravity for two first and/or second energy generating units comprising downwind rotors and two first and/or second energy generating units comprising upwind rotors form corners of a regular tetrahedron.

7. The multirotor wind turbine according to claim 1, wherein at least one load carrying structure is arranged to carry at least three first energy generating units comprising a downwind rotor and at least two second energy generating units comprising an upwind rotor, and wherein the load carrying structure comprises at least three arms, each arm carrying a first energy generating unit comprising a downwind rotor and a second energy generating unit comprising an upwind rotor, and each arm being connected to the tower structure via a common connecting part.

8. The multirotor wind turbine according to claim 1, wherein at least one load carrying structure comprises at least two primary structures and at least two secondary structures, and wherein gravity acting on the first and/or second energy generating units being carried by the load carrying structure causes push in the primary structures and pull in the secondary structures.

9. The multirotor wind turbine according to claim 8, wherein the primary structures are in the form of one or more compression bars.

10. The multirotor wind turbine according to claim 8, wherein the secondary structures are in the form of one or more tension members.

11. A multirotor wind turbine comprising a tower structure and at least one load carrying structure, each load carrying structure being arranged for carrying two or more first energy generating units and for being connected to the tower structure, each first energy generating unit comprising a first rotor, and each first energy generating unit having a centre of gravity,
  wherein at least two of the first rotors are downwind and/or upwind rotors, the first energy generating units comprising the at least two first rotors being arranged with their respective centres of gravity at a first distance from the tower structure along a direction of the incoming wind, substantially at the same vertical level, and at opposite sides of the tower structure at substantially the same second distance to the tower structure along a direction substantially perpendicular to the direction of the incoming wind; and
  wherein at least one of the at least one load carrying structure is arranged to carry at least one second energy generating unit, the at least one second energy generating unit being an upwind rotor if the at least two first rotors are downwind rotors, and the at least one second energy generating unit being a downwind rotor if the at least two first rotors are upwind rotors, the centre of gravity of at least one of the second energy generating units being arranged at a third distance from the tower structure along the direction of the incoming wind.

12. A multirotor wind turbine comprising a tower structure and at least one load carrying structure, each load carrying structure being arranged for carrying two or more first energy generating units and for being connected to the tower structure, each first energy generating unit comprising a first rotor, and each first energy generating unit having a centre of gravity,
  wherein at least two of the first rotors are downwind and/or upwind rotors, the first energy generating units comprising the at least two first rotors being arranged with their respective centres of gravity at a first distance from the tower structure along a direction of the incoming wind, substantially at the same vertical level, and at opposite sides of the tower structure at substantially the same second distance to the tower structure along a direction substantially perpendicular to the direction of the incoming wind; and
  wherein at least one load carrying structure is arranged to carry at least three first and/or second energy generating units comprising a downwind rotor and at least two first and/or second energy generating units comprising an upwind rotor, and wherein the load carrying structure comprises at least three arms, each arm carrying a first and/or second energy generating unit comprising a downwind rotor and a first and/or second energy generating unit comprising an upwind rotor, and each arm being connected to the tower structure via a common connecting part.

* * * * *